United States Patent [19]
Baran et al.

[11] Patent Number: 5,133,029
[45] Date of Patent: Jul. 21, 1992

[54] ADIABATIC POLARIZATION SPLITTER

[75] Inventors: Jane E. Baran, Metuchen; David A. Smith, Freehold, both of N.J.

[73] Assignee: Bell Communications Research, Inc., Livingston, N.J.

[21] Appl. No.: 722,703

[22] Filed: Jun. 28, 1991

[51] Int. Cl.$^5$ ............................................. G02B 5/30
[52] U.S. Cl. ........................................ 385/11; 385/27; 385/43; 385/45; 359/485
[58] Field of Search ............... 350/96.12, 96.15, 96.16; 385/27, 39, 43, 45, 50, 11; 359/483, 485, 487, 488

[56] References Cited

U.S. PATENT DOCUMENTS

| | | | |
|---|---|---|---|
| 4,778,236 | 10/1988 | Miyawaki | 350/96.12 X |
| 4,998,793 | 3/1991 | Henry et al. | 350/96.15 |
| 5,002,349 | 3/1991 | Cheung et al. | 350/96.13 |
| 5,048,909 | 9/1991 | Henry et al. | 385/27 |

OTHER PUBLICATIONS

D. A. Smith et al., "Polarization-Independent Acoustically Tunable Optical Filter," *Applied Physics Letters,* Jan. 1990, vol. 56, pp. 209-211.

N. Goto et al., "A TE-TM Mode Splitter in LiNbO$_3$ by Proton Exchange and Ti Diffusion," *Journal of Lightwave Technology,* Oct. 1989, vol. 7, pp. 1567-1574.

Y. Shani et al., "Integrated Optic Adiabatic Polarization Splitter on Silicon," *Applied Physics Letters,* Jan. 1990, vol. 56, pp. 120-121.

M. Izutsu et al., "Optical-Waveguide Hybrid Coupler," *Optics Letters,* Nov. 1982, vol. 7, pp. 549-551.

A. Neyer, "Low-Crosstalk Passive Polarization Splitters Using Ti:LiNbO$_3$ Waveguide Crossings," Sep. 1989, *Applied Physics Letters,* vol. 55, pp. 927-929.

W. K. Burns et al., "Mode Conversion in Planar-Dielectric Separating Waveguides," *IEEE Journal of Quantum Electronics,* Jan. 1975, vol. QE-11, pp. 32-39.

*Primary Examiner*—John D. Lee
*Attorney, Agent, or Firm*—Leonard C. Suchyta; Charles S. Guenzer

[57] ABSTRACT

A 2×2 polarization beam splitter comprising two parallel waveguides and two crossing waveguides coupled in an X-configuration to the parallel waveguides by four adiabatic γ-junctions which transfer only one of the two orthogonal polarization modes across the junctions, e.g., the TE mode. The crossing waveguides may be of different widths and cross at a very shallow angle so that little cross-talk occurs at the crossing.

14 Claims, 1 Drawing Sheet

ADIABATIC POLARIZATION SPLITTER

FIELD OF THE INVENTION

The invention relates generally to solid-state optical waveguides; in particular, it relates to a splitter for such waveguides which separates the guided optical signal according to polarization.

BACKGROUND ART

Opto-electronic integrated circuits (OEICs) will increasingly be used in telecommunications, computing, and signal processing. Several applications for OEICs require the optical separation of the two orthogonal polarization modes carried on a single-mode waveguide in the OEIC. An example of such an OEIC is a polarization-diversity receiver which splits the incoming light into two beams propagating on separate waveguides according to the polarization of the light. It then separately detects the intensities of both polarization modes. The two modes are represented alternatively as the TE and TM modes or as the H and V modes. In the TE or H mode, the electric vector of the propagating light is parallel to the top surface of the waveguide while in the TM or V mode it is perpendicular. A generic 2×2 polarization beam splitter 10 is illustrated schematically in FIG. 1. A first input waveguide 12 carries orthogonal signals H and V while a second input waveguide 14 carries orthogonal signals H' and V'. The polarization beam splitter 10 preferentially acts on the orthogonal polarizations such that a first output waveguide 16 carries the signals H' and V and a second output waveguide 18 carries the signals H and V'. If the second input waveguide 14 is disregarded, then the H and V input signals on the first input waveguide 12 are split according to polarization onto the two output waveguides 18 and 16 respectively. This would be a 1×2 splitter.

The devices described herein are reciprocal devices so that a splitter operated in the reverse direction is a combiner. For example, the above 1×2 splitter is also a 2×1 polarization combiner receiving H and V input signals from the right on waveguides 18 and 16 respectively and outputting both H and V signals on the first waveguide 12. Hereinafter, a splitter will be understood to encompass a combiner.

A common integrated type of 2×2 polarizing beam splitter is a directional coupler as, disclosed, for example, by Cheung et al. in U.S. Pat. No. 5,002,349 for LiNbO$_3$ substrates. Smith et al. reported some of the same work in "Polarization-independent acoustically tunable optical filter," Applied Physics Letters, volume 56, 1990, pp. 209-211. This splitter has two continuous optical waveguides which are brought closely together in an interaction region in which the TM mode but not the TE mode spatially oscillate from one waveguide to the other. Thus, if the length of the coupling region is made to be exactly one coupling length, the TM modes are exchanged between the two waveguides. However, the degree of coupling depends strongly on the small separation between the waveguides, and, hence, it is difficult to make the coupling region of exactly the right length. A directional coupler can be tuned electrostatically, but a completely passive and accurate polarizing beam splitter is desired.

Goto et al. have disclosed an adiabatic Y-branch polarizing splitter in "A TE-TM mode splitter in LiNbO$_3$ by proton exchange and Ti diffusion," Journal of Lightwave Technology, volume 7, 1989, pp. 1567-1574. This device amounts to a 1×2 polarization beam splitter. In it, the end of a first waveguide is obliquely butted up to the side of second waveguide carrying the two polarization states (modes). The butted structure is adiabatically configured such that the fundamental mode of each polarization state adiabatically evolves into that waveguide which has the highest effective index for that polarization state. It is, however, not clear how to apply the device of Goto et al. to a 2×2 splitter. Shani et al. have disclosed a similar adiabatic 1×2 splitter in "Integrated optic adiabatic polarization splitter on silicon," Applied Physics Letters, volume 56, 1990, pp. 120-121.

Izutsu et al. have disclosed another type of beam splitter in "Optical-waveguide hybrid coupler", Optics Letters, volume 7, 1982, pp. 549-551. In this device, two waveguides cross at an adiabatic X-junction, and their widths asymmetrically change at the junction. Neyer discloses another, non-adiabatic X-junction beam splitter in "Low-crosstalk passive polarization splitters using Ti:LiNbO$_3$ waveguide crossings," Applied Physics Letters, volume 55, 1989, pp. 927-929. In this device, the polarization splitting function is achieved similarly to the directional coupler.

SUMMARY OF THE INVENTION

Accordingly, an object of the invention is to provide a 2×2 integrated polarization beam splitter that is passive and easily fabricated.

The invention can be summarized as a polarization beam splitter having two input/output waveguides formed in a substrate. Two linking waveguides cross each other at a point between the input/output waveguides, and their ends are coupled to the input/output waveguides by four adiabatic Y-junctions. The two linking waveguides may cross in an X-junction having minimal power leakage between the crossing waveguides. For example, two waveguides of sufficient asymmetry may cross at a very shallow angle in an asymmetric X-junction.

DETAILED DESCRIPTION OF THE PREFERRED EMBODIMENT

Figure 1:
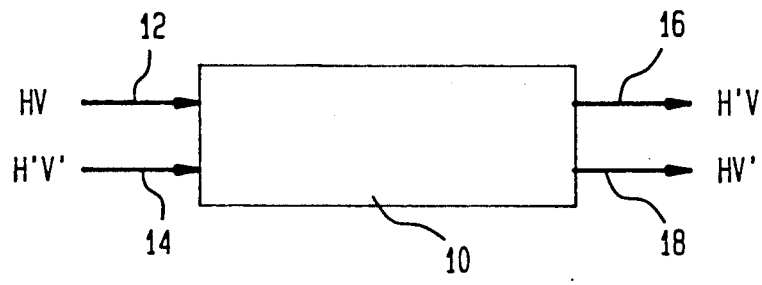
FIG. 1 is a schematic of a generic 2×2 polarization beam splitter.

As illustrated in plan view in FIG. 1, a 2×2 polarization beam splitter 20 of the invention has two parallel waveguides 22 and 24 formed in the surface of a portion of a substrate 26. The parallel waveguides 22 and 24 function as both input and output waveguides to and from the beam splitter 20. Two crossing waveguides 28 and 30 are also formed in the surface of the substrate 26. Their ends are tapered at an angle θ (greatly exaggerated in the figure) and are coupled to the parallel waveguides 22 and 24 at four adiabatic Y-junctions 32, 34, 36, and 38. By Y-junction is meant that the crossing waveguide 28 or 30 approaches the parallel waveguide 22 or 24 at a very small angle, usually much less than 1°, so that one of the modes adiabatically evolves across the Y-junction, assuming the coupled waveguides have proper modal asymmetry. By adiabatic is meant that the junction avoids a noticeable amount of conversion to higher-order modes other than that excited by the input waveguide. Adiabatic behavior is discussed by Burns et al. in "Mode Conversion in Planar-Dielectric Separating Waveguides," Journal of Quantum Electronics, volume 111, 1975, pp. 32-39. The crossing waveguides 28 and 30 have different widths $W_{PE,1}$ and $W_{PE,2}$ and cross at an angle $2\theta$ in an asymmetric X-junction 40. At least the parallel waveguides 22 and 24 support only a single mode in two polarization states at the optical wavelength $\lambda$ of operation.

Let it be assumed that light of mixed polarization is input from the left onto both the parallel waveguides 22 and 24. In the left-hand Y-junctions 32 and 36, the components of a first polarization, for example, the TE modes, are transferred to the crossing waveguides 28 and 30, while the components of the other polarization, the TM modes in the example, stay on the parallel waveguides 22 and 24. At the X-junction 40, because of the small crossing angle $2\theta$, the two TE modes cross with minimal power splitting between the crossing waveguides 28 and 30. In the right-hand Y-junctions 34 and 38, the TE modes adiabatically transfer from the crossing waveguides 28 and 30 to the parallel waveguides 24 and 22 respectively, that is, to the opposite ones from which they originated. Each TE mode is thus recombined with the TM mode of the other input signal. Thereby, the polarization beam splitter 20 of FIG. 2 provides the functionality of the generic 2×2 beam splitter of FIG. 1.

Figure 2:
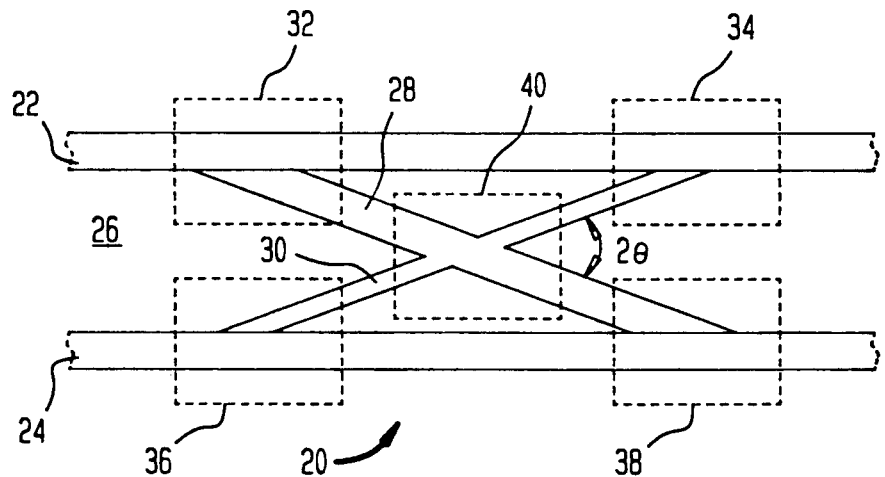
FIG. 2 is a plan view of an embodiment of a polarization beam splitter of the invention.

The polarization beam splitter 20 of FIG. 2 is passive, having no turning electrodes. Its fabrication allows looser tolerances than prior-art 2×2 splitters. In comparison, the directional coupler and the non-adiabatic (so-called interferometric X-junctions) have tight length constraints because the transferred power depends on the sine-squared of the length. In contrast, adiabatic Y-junctions only require that the mode evolution is gradual enough to prevent appreciable modal interconversion. If the substrate 26 is LiNbO$_3$, then the Y-junctions may be of the form disclosed by Goto et al. In this case, the parallel waveguides 22 and 24 can be formed by indiffusion of Ti, and the crossing waveguides 28 and 30 can be formed by proton exchange. The X-junction 40 should be formed at a very small angle $2\theta$, and with sufficient asymmetry, to reduce power splitting between the crossing waveguides 28 and 30. Asymmetry more generally means a different in modal propagation constants. For example, asymmetry can be achieved in Ti waveguides of equal widths by diffusion in different thicknesses of Ti. The X-junction can alternatively be formed symmetrically at near perpendicular angles. This requirement has been details by Burns et al.

EXAMPLE 1

A LiNbO$_3$ 2×2 polarization beam splitter of the invention was fabricated and tested. An x-cut, y-propagating LiNbO$_3$ substrate was used, as disclosed by Cheung et al. The parallel waveguides 22 and 24 were formed by depositing 70 nm thick strips of Ti onto the substrate and annealing at 1050° C. for 8.5 hours in a closed platinum crucible. The Ti strips had widths $W_{Ti}$ of 8 $\mu$m wide and were 35 $\mu$m apart.

The crossing waveguides 28 and 30 were formed by photolithographically patterning an aluminum mask on the LiNbO$_3$ after the Ti-indiffusion and performing the proton exchange through the mask. The proton exchange was carried out at 212° C. in a pure benzoic acid melt for 30 minutes. Thereafter, the sample was annealed at 360° C. in an air ambient for 11 hours.

Figure 3:
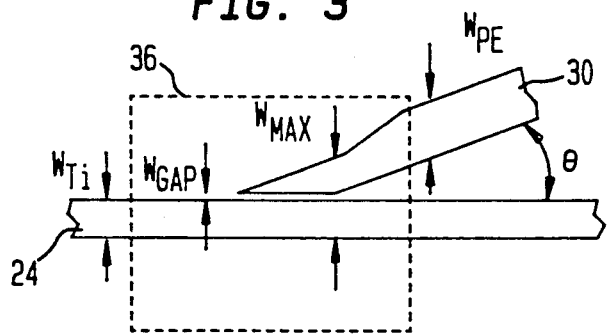
FIG. 3 is a detailed view of one of the adiabatic Y-junctions of FIG. 2.

In patterning the aluminum mask, the taper angle $\theta$ was maintained at 4.0 milliradians, but the other parameters in the design of the crossing waveguides 28 and 30 were varied to obtain the best characteristics. The Y-junction 36 is illustrated in the detailed view of FIG. 3, but the other Y-junctions 35, 34, and 38 differ only in orientation. The proton-exchange waveguide 30 is separated from the TI waveguide 24 by a gap of width $W_{gap}$. Near the Ti waveguide 24, the crossing waveguide 30 has an outside edge (upper edge as illustrated) sloping at a very small taper angle $\theta$. There results a sharply tapered portion in which the TE mode can adiabatically evolve from the Ti waveguide 24 onto the crossing waveguide 30. The taper angle is generally much less than 1°. The tapering is continued to the point that the maximum junction width $W_{max}$ is achieved. Thereafter, the outside edge is outwardly flared over a distance of abut 1 mm to meet the width $W_{PE,1}$ or $W_{PE,2}$ of that crossing waveguide 28 or 30. The inside edge of the crossing waveguide 30 maintains a slop of $\theta$, even through the X-junction 40. The device judged to have the best characteristics had a gap $W_{gap}$ of 1 $\mu$m, widths $W_{PE,1}$ and $W_{PE,2}$ of the crossing waveguides 28 and 30 of 9 and 7 $\mu$m, respectively, and a maximum junction width $W_{max}$ of 14 $\mu$m.

After fabrication of the waveguides, the substrate was cut and polished perpendicularly to the parallel waveguides 22 and 24 and optical fibers were coupled to them on the input ends. For the experiments, the optical outputs were processed using bulk optics.

The beam splitter was tested with a 1531 nm laser diode launching light into left side of the parallel waveguides 22 and 24 and measuring the light emitted from the right side. A polarization controller on the input side and a crystal polarizer on the output side respectively controlled and allowed determination of the polarization characteristics of the device. The numerical results ar tabulated in the following table:

| Input Branch | 22 | | 24 | |
| --- | --- | --- | --- | --- |
| Output Branch | 24 | 22 | 22 | 24 |
| Polarization | TE | TM | TE | TM |
| Extinction (dB) | 20.2 | 25.5 | 24.8 | 26.0 |
| Excess Loss (dB) | 1.2 | 1.8 | 0.6 | 0.7 |

The table shows that the lower parallel waveguide 24 exhibited better results than the upper one. This difference probably arose because the 7 $\mu$m crossing waveguide 30 was single-mode while the 9 $\mu$m crossing waveguide 28 was multi-mode.

EXAMPLE 2

Another device was fabricated with the same widths of the proton-exchanged waveguides, but with a gap $W_{gap}$ of zero. It exhibited 20 dB extinction ratios, but the excess loss for the TM mode in either branch was 3 dB or greater.

Although the invention has been primarily described with reference to diffused waveguides in lithium niobate, it can be applied also to other substrates and waveguide structures for which suitable structures are available for polarization mode sorting, e.g., crystalline silicon and III-V semiconductors with various waveguide structures, and silica waveguides. For example, Shani et al. provided an adiabatic Y-junction using silica and silicon nitrite on crystalline silicon.

Although in the examples, the input/output waveguides were parallel and the crossing waveguides were straight and crossed at a very shallow angle, the invention is not so limited. With a high angle of crossing, the crossing waveguides could have the same widths. The polarization mode which follows the crossing waveguides depends on the choice of substrates and details of the fabrication.

The invention thus provides good polarization beam splitting in a simple configuration, achievable with simple processing and at loose tolerances.

What is claimed is:

1. A polarization beam splitter, comprising:
   a substrate;
   a first waveguide and a second waveguide formed in said substrate along respective first and second axes, said first and second waveguides being separated and not crossing; and
   a third waveguide formed in said substrate along a third axis and having respective ends coupled to respective first middle portions of said first and second waveguides in first and second polarization-separating Y-junctions respectively spanning said first middle portions.

2. A polarization beam splitter as recited in claim 1, wherein all said Y-junctions are adiabatic.

3. A polarization beam splitter as recited in claim 1, further comprising:
   a fourth waveguide formed in said substrate, having respective ends coupled to said first and second waveguides in third and fourth polarization-separating Y-junctions, and crossing said third waveguide in an X-junction.

4. A polarization beam splitter as recited in claim 3, wherein all said Y-junctions are adiabatic.

5. A polarization beam splitter as recited in claim 3, wherein all said Y-junctions preferentially couple a predetermined polarization component between one of said first and second waveguides and one of said third and fourth waveguides.

6. A polarization beam splitter as recited in claim 5, wherein said ends of said third and fourth waveguides are formed into tapered portions adjacent to said first and second waveguides.

7. A polarization beam splitter as recited in claim 3, wherein all of aid Y-junctions couple a substantially greater portion of light of a first polarization than light of a second polarization between one of said first and second waveguides and one of said third and fourth waveguides.

8. A polarization beam splitter as recited in claim 1, wherein said first and second waveguides comprise respective continuous cores.

9. A polarization beam splitter as recited in claim 8, wherein said cores have a same composition and a same cross-section.

10. A polarization beam splitter as recited in claim 1, wherein said first, second, and third axes do not vertically overlie one another in parallel.

11. A polarization beam splitter, comprising:
    a substrate;
    a first waveguide and a second waveguide formed in said substrate;
    a third waveguide formed in said substrate and having respective ends coupled to said first and second waveguides in first and second polarization-separating Y-junctions; and
    a fourth waveguide formed in said substrate, having respective ends coupled to said first and second waveguides in third and fourth polarization-separating Y-junctions, and crossing said third waveguide in an asymmetrical X-junction, wherein said third and fourth waveguides have different widths;
    wherein all said Y-junctions preferentially couple a predetermined polarization component between one of said first and second waveguides and one of said third and fourth waveguides.

12. A polarization beam splitter as recited in claim 11, wherein said substrate comprises lithium niobate, said first and second waveguides comprise Ti-rich areas of said substrate, and said third and fourth waveguides comprise proton-rich areas of said substrate.

13. A polarization beam splitter, comprising:
    first, second, third, and fourth optical waveguides;
    first adiabatic mode coupling means for optically coupling a first end of said third waveguide with a first central portion of said first waveguide;
    second adiabatic mode coupling means for optically coupling a second end of said third waveguide with a first central portion of said second waveguide;
    third adiabatic mode coupling means for optically coupling a first end of said fourth waveguide with a second central portion of said first waveguide; and
    fourth adiabatic mode coupling means for optically coupling a second end of said fourth waveguide with a second central portion of said second waveguide.

14. A polarization beam splitter as recited in claim 13, wherein all said coupling means are disposed within a common plane.

* * * * *

UNITED STATES PATENT AND TRADEMARK OFFICE
CERTIFICATE OF CORRECTION

PATENT NO. : 5,133,029

DATED : July 21, 1992

INVENTOR(S) : Jane E. Baran and David A. Smith

It is certified that error appears in the above-identified patent and that said Letters Patent is hereby corrected as shown below:

Column 3, line 6, "lll" should read --ll--;
         line 48, "different" should read --difference--;
         line 51, "diffusion" should read --diffusing--;
         line 53, "details" should read --detailed--.
Column 4, line 11, "TI" should read --Ti--;
         line 21, "abut" should read --about--;
         line 23, "slop" should read --slope--;
         line 41, "ar" should read --are--.
Column 5, line 49, "aid" should read --said--.

Signed and Sealed this

Thirty-first Day of August, 1993

Attest:

BRUCE LEHMAN

Attesting Officer      Commissioner of Patents and Trademarks